(12) United States Patent
Babushkin

(10) Patent No.: US 11,200,402 B2
(45) Date of Patent: Dec. 14, 2021

(54) APPLICATION EXECUTION BASED ON OBJECT RECOGNITION

(71) Applicant: GICSOFT, Inc., Duluth, GA (US)

(72) Inventor: Igor Babushkin, Johns Creek, GA (US)

(73) Assignee: GICSOFT, INC., Duluth, GA (US)

( * ) Notice: Subject to any disclaimer, the term of this patent is extended or adjusted under 35 U.S.C. 154(b) by 119 days.

(21) Appl. No.: 15/880,731

(22) Filed: Jan. 26, 2018

(65) Prior Publication Data

US 2019/0236334 A1 Aug. 1, 2019

(51) Int. Cl.
*G06K 9/00* (2006.01)
*G06T 7/80* (2017.01)
*G06F 16/583* (2019.01)

(52) U.S. Cl.
CPC ..... *G06K 9/00201* (2013.01); *G06F 16/5854* (2019.01); *G06T 7/85* (2017.01); *G06T 2207/10012* (2013.01)

(58) Field of Classification Search
None
See application file for complete search history.

(56) References Cited

U.S. PATENT DOCUMENTS

| | | | | |
|---|---|---|---|---|
| 6,061,726 | A * | 5/2000 | Cook | G06F 9/468 709/220 |
| 7,397,464 | B1 * | 7/2008 | Robbins | G06F 3/0425 345/156 |
| 8,117,225 | B1 * | 2/2012 | Zilka | G06F 16/951 707/769 |
| 10,776,933 | B2 * | 9/2020 | Faulkner | G06F 3/011 |
| 10,930,015 | B2 * | 2/2021 | Raag | H04N 13/246 |
| 10,939,182 | B2 * | 3/2021 | Boskovich | G06F 16/433 |
| 2009/0300062 | A1 | 12/2009 | Francois et al. | |
| 2011/0202730 | A1 * | 8/2011 | Sonoda | H04L 67/2852 711/141 |
| 2012/0240212 | A1 * | 9/2012 | Wood | H04L 9/088 726/10 |
| 2013/0007668 | A1 | 1/2013 | Chia-Ming et al. | |
| 2014/0036099 | A1 | 2/2014 | Edward | |
| 2014/0059458 | A1 * | 2/2014 | Levien | G06T 11/00 715/765 |
| 2014/0075004 | A1 * | 3/2014 | Van Dusen | G06F 16/90335 709/223 |

(Continued)

FOREIGN PATENT DOCUMENTS

CN 102298533 B 5/2015

OTHER PUBLICATIONS

English Abstractor CN 107463833 A (Year: 2017).*

(Continued)

*Primary Examiner* — Michelle M Entezari
(74) *Attorney, Agent, or Firm* — Thomas Horstemeyer, LLP

(57) ABSTRACT

Disclosed are various embodiments for initiating execution of an application based at least in part on an identification of the object in an image, video, or other graphical representation of the object. A graphical representation of an object is obtained using an image capture device. The object in the graphical representation is identified along with a list of applications associated with the identified object. A user interface is then rendered that allows the user to execute or install one or more of the applications associated with the identified object.

20 Claims, 6 Drawing Sheets

(56) References Cited

U.S. PATENT DOCUMENTS

| | | |
|---|---|---|
| 2014/0214547 A1 | 7/2014 | Signorelli et al. |
| 2014/0267770 A1 | 9/2014 | Michael et al. |
| 2015/0016675 A1 | 1/2015 | Kishi |
| 2015/0113059 A1 | 4/2015 | Kenton |
| 2016/0012467 A1* | 1/2016 | Nakai ................ G06Q 30/0217 705/14.19 |
| 2016/0189286 A1* | 6/2016 | Zohar ................ G06K 9/00355 348/150 |
| 2016/0269179 A1* | 9/2016 | White ................... H04L 9/0897 |
| 2017/0188239 A1* | 6/2017 | Matsuno ............... H04W 12/08 |
| 2017/0220577 A1* | 8/2017 | Pal ......................... G06Q 50/01 |
| 2018/0060400 A1* | 3/2018 | Wu ......................... G06F 16/20 |
| 2018/0121324 A1* | 5/2018 | Tucker ................ G06F 11/3664 |
| 2018/0365898 A1* | 12/2018 | Costa .................. G02B 27/0172 |
| 2019/0012187 A1* | 1/2019 | Picard ................ G06F 9/44526 |
| 2019/0035091 A1* | 1/2019 | Bi ......................... H04N 5/247 |
| 2019/0036933 A1* | 1/2019 | Pitchaimani ............ H04L 67/10 |

OTHER PUBLICATIONS

International Search Report and Written Opinion dated Apr. 15, 2019 (PCT/US2019/014700).

European Search Report dated Sep. 21, 2021 for European Patent Application No. 19743423.6.

\* cited by examiner

APPLICATION EXECUTION BASED ON OBJECT RECOGNITION

BACKGROUND

Users often wish to execute an application based on particular contexts. For example, example, a user may wish to execute an application in order to interact with a device or object (e.g., use his or her smartphone as a remote control for his or her television). However, the computing device is often not aware of the particular object that is prompting the user to execute an application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for initiating execution of an application or installing an application based at least in part on an identification of the object in an image, video, or other graphical representation 103 of the object. The graphical representation 103 (e.g., photograph, image, video, stereoscopic image, etc.) of an object can be obtained using an image capture device (e.g., a camera, video camera, stereoscopic camera, etc.). The object is then identified and a list of applications associated with the identified object is determined. A user interface is then rendered that allows the user to execute or install one or more of the applications associated with the identified object. In the following discussion, a general description of the system and its components is provided, followed by a discussion of the operation of the same.

Figure 1:
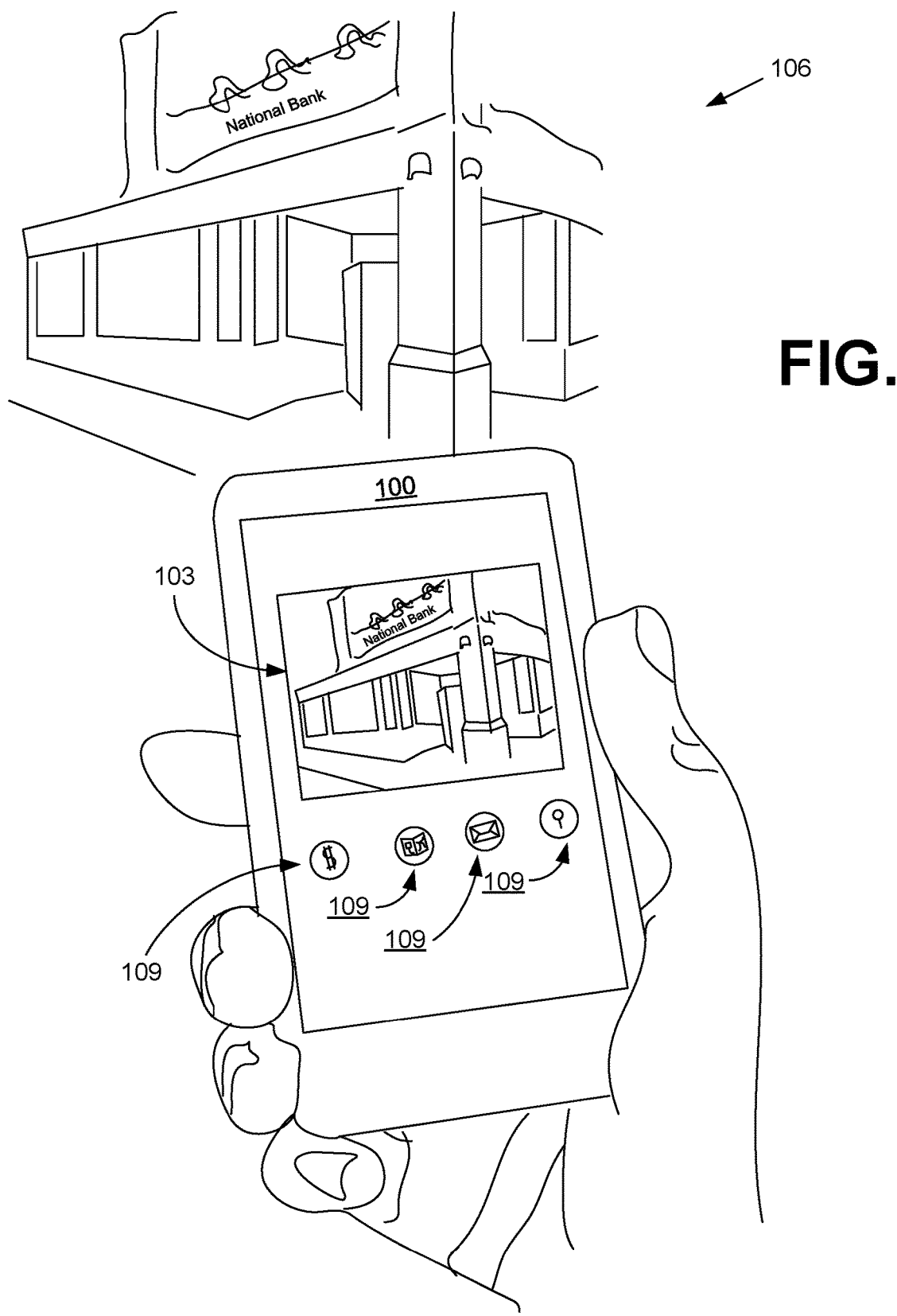
FIG. 1 is a drawing depicting one of several embodiments of the present disclosure.

As illustrated in FIG. 1, a user can use an image capture device (e.g., a camera, a video camera, or a stereoscopic camera) of a client device 100 (e.g., a smartphone, tablet, etc.) to capture a graphical representation 103 (e.g., a photograph or similar image, a video, or a stereoscopic image) of an object 106. The graphical representation 103 can then be processed or otherwise analyzed to identify the object 106 using various techniques. One or more applications 109 associated with the object 106 are then identified and presented to the user, who can select one or more of the applications 109 to execute. For example, it the user were to use his or her smartphone to take a photograph of a local bank branch, the building in the photograph could be identified as well as the fact that the building is a bank, the name of the bank, and the location of the bank branch in the photograph. A number of applications 109 that are associated with the bank branch might then be presented to the user, including a banking application 109 (e.g., for performing an electronic banking task), a maps or navigation application 109 (e.g., for directions to or from the bank), a messaging application 109 (e.g., for sending a message to the bank), or some other application 109.

Figure 2:
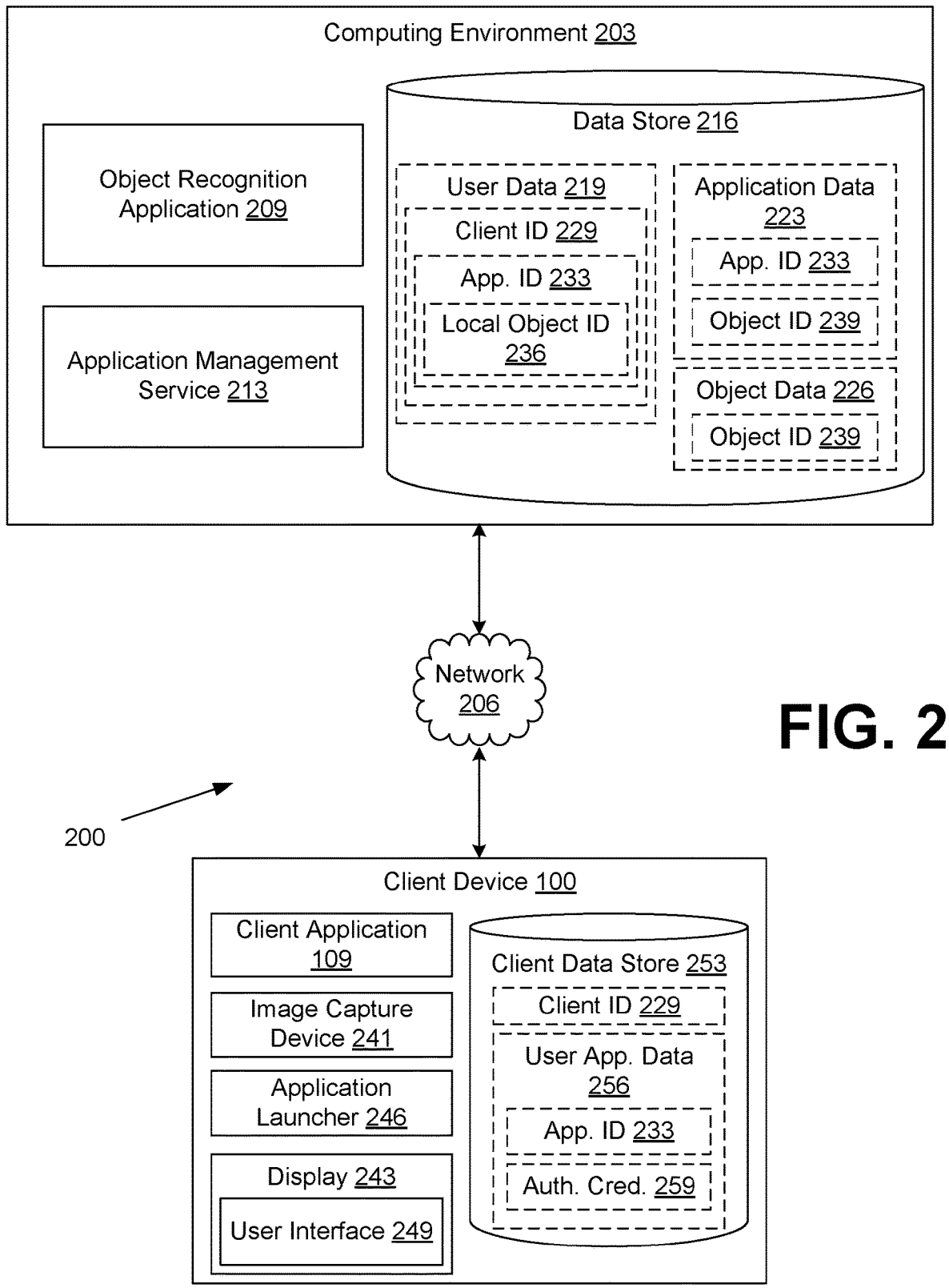
FIG. 2 is a drawing of a networked environment according to various embodiments of the present disclosure.

With reference to FIG. 2, shown is a networked environment 200 according to various embodiments. The networked environment 200 includes a computing environment 203 and a client device 100, which are in data communication with each other via a network 206. The network 206 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 206 can also include a combination of two or more networks 206. Examples of networks 206 can include the Internet, intranets, extranets, virtual private networks (VPNs), and similar networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource or any other distributed computing arrangement. In some cases, the computing environment 203 may correspond to an elastic computing resource where the allotted capacity of processing, network, storage, or other computing-related resources may vary over time.

Various applications or other functionality may be executed in the computing environment 203 according to various embodiments. The components executed on the computing environment 203, for example, include object recognition application 209, an application management service 213, and other applications, services, processes, systems, engines, or functionality not discussed in detail herein.

The object recognition application 209 is executed to process graphical representations of objects 106 (FIG. 1) (e.g., photographs, videos, stereoscopic images or photographs, and similar visual depictions of an object 106).

Various object recognition or computer vision techniques may be used to identify an object 106.

The application management service 213 is executed to manage information related to individual client applications 109 that may be installed on the client device 100. This may include creating and maintaining associations between an object 106 and a client application 109. These associations may be global in scope or may be specific to a user or client device 100. For example, a bank may create an association between an object 106 representing their bank branch or a check and the bank's client application 109 that they make available for use on client devices 100. Likewise, a user may create his or her own personal association between the banking client application 109 and a bill in order for the user to facilitate easier payment of the bill. In some instances, the functionality of the application management service 213 may be incorporated into an "application store," which allows users to purchase, download, install, and manage client applications 109. Examples of such "application stores" include the APPLE ITUNES APP STORE®, GOOGLE PLAY STORE®, or the MICROSOFT WINDOWS STORE®.

Also, various data is stored in a data store 216 that is accessible to the computing environment 203. The data store 216 may be representative of a plurality of data stores 216, which can include relational databases, object-oriented databases, hierarchical databases, hash tables or similar key-value data stores, as well as other data storage applications or data structures. The data stored in the data store 216 is associated with the operation of the various applications or functional entities described below. This data can include user data 219, application data 223, object data 226, and potentially other data.

The user data 219 represents information about a user. This can include a client identifier 229 for each client device 100 associated with a user, as well as other information about a user. The client identifier 229 can include any identifier that uniquely represents a client device 100, such as a serial number, an international mobile equipment identity (IMEI) number, a media access control (MAC) address of a network interface included in the client device 100, or similar identifier. Stored in association with each client identifier 229 is an application identifier 233 that uniquely identifies a client application 109. When the application identifier 233 is associated with a client identifier 229, this can indicate that the corresponding or respective client application 109 is installed on the client device 100 identified by the client identifier 229. Each application identifier 233 in the user data 219 may also include a local object identifier 236. The local object identifier 236 can be used to represent a user created link or association between an object 106 a client application 109. However, the local object identifier 236 can also be used in some embodiments as a mask or filter that represents a user created disassociation between an object 106 and a client application 109, as discussed in more detail later in this application.

The application data 223 represents globally available information about a client application 109. This can include an application identifier 233, and one or more object identifiers 239. The object identifier 239 creates an association between an object 106 and the client application 109 that is visible to all users, in contrast to a personal association between an object 106 and a client application 109 that is created by a user with the local object identifier 236. The object identifier 239 can include any key that can be used to uniquely identify the appropriate object data 226 for an object 106.

The object data 226 represents information about objects 106. This can include the name, description, and location of an object 106. The object data 226 can also include the necessary reference data for the object recognition application 209 to compare with a graphical representation 103 of an object 106 in order to identify an object 106. For example, the object data 226 could include one or more sets of feature points that act as a reference for the object 106. The object data 226 can be generic for a class of objects 226. However, each individual object 106 in a class of object 106 can also have its own object data 226. For example, there may be object data 226 that generically represents all pick-up trucks as well as corresponding object data 226 for each pick-up truck in the world or a subset thereof. Each instance of object data 226 also includes an object identifier 239.

The client device 100 is representative of a plurality of client devices that may be coupled to the network 206. The client device 100 may include, for example, a processor-based system such as a computer system. Such a computer system may be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 100 may include an image capture device 241, such as a camera, a video camera, a stereoscopic or three-dimensional camera, or similar device capable of capturing an image or other graphical representation 103 of an object 106. The client device 100 may include one or more displays 243, such as liquid crystal displays (LCDs), gas plasma-based flat panel displays, organic light emitting diode (OLED) displays, electrophoretic ink ("E-ink") displays, projectors, or other types of display devices. In some instances, the display 243 may be a component of the client device 100 or may be connected to the client device 100 through a wired or wireless connection.

The client device 100 may be configured to execute various applications such as a client application 109, an application launcher 246, or other applications. The client application 109 may be executed in a client device 100, for example, to access network content served up by the computing environment 203 or other servers, thereby rendering a user interface 249 on the display 243. To this end, the client application 109 may include, for example, a browser, a dedicated application, or other executable and the user interface 249 may include a network page, an application screen, or other user mechanism for obtaining user input. Examples of client applications 109 include banking applications, email applications, social networking applications, map or navigation applications, games, word processors, spreadsheets, or other applications. The application launcher 246 may be executed in response to the operation of an image capture device 241 included in or in data communication with the client device 100. The application launcher 246 may obtain, intercept, or receive a graphical representation 103 of an object 106. In some embodiments, the application launcher 246 can then provide the graphical representation 103 of the object 106 to the object recognition application 209. In other embodiments, the application launcher 246 may process the graphical representation 103 of the object 106 to generate a secondary representation of the object 106, such as a plurality of feature points corresponding to an object 106 in the graphical representation 103. In response, the application launcher 246 receives a list of application identifiers 233 that are associated with the identified object 106. The application launcher can then cause the user interface 249 to present one or more options to launch one or more of the client applications 109 included in the list of application identifiers 233.

The client device 100 can also include a client data store 253 that is accessible to the client device 100 and one or more applications executing on the client device 100. The client data store 253 may be representative of a plurality of client data store 253, which can include relational databases, object-oriented databases, hierarchical databases, hash tables or similar key-value data stores, as well as other data storage applications or data structures. The data stored in the client data store 253 is associated with the operation of the client application(s) 109 and the application launcher 246. This data can include the client identifier 229 previously described above, user application data 256, and potentially other data.

The user application data 256 represents data accessible by a corresponding client application 109 installed on the client device 100. In some embodiments, access to the user application data 256 may be restricted to a specific client application 109 or set of client applications 109. For example, only a client application 109 with the application identifier 233 that matches the application identifier 233 linked to the user application data 256 may be allowed to access the user application data 256. Access may be limited in order to protect the security of a user's authentication credentials 259 stored in the user application data 256. Each client application 109 installed on the client device 100 may have its own user application data 256 stored in the client data store 253.

The authentication credentials 259 represent data that identifies and authenticates a user. For example, a client application 109 may need authentication credentials 259 in order for the client application 109 to access a user's data on a remote server. For example, a banking application may need a user's authentication credentials 259 in order to access a user's bank account. As another example, an email application may need a user's authentication credentials 259 in order to access a user's email stored on a remote server. Authentication credentials 259 can include a username, a password, a cryptographic certificate, a cryptographic key (e.g., a user's private key that is used in asymmetric encryption algorithm to identify the user), or similar data.

Next, a general description of the operation of the various components of the networked environment 200 is provided. Although the following general description provides an exemplary illustration of the interaction between a number of the components in the networked environment 200, the components may interact in other ways as well. Additional detail about some of the interactions between the components is provided later in this application.

To begin, a user of the client device 100 uses the image capture device 241 to obtain, capture, or otherwise generate a graphical representation 103 of an object 106. For example, the user may take a picture, capture a video, or obtain or generate some other graphical representation 103 of the object 106. In some instances, the user may manually instruct or otherwise cause the application launcher 246 to send the graphical representation 103 of the object 106 to the object recognition application 209. In other instances, the application launcher 246 may automatically send the graphical representation 103 of the object 106 to the object recognition application 209. For example, the application launcher 246 may have been previously assigned the necessary permissions to access the image capture device 241 or data generated by the image capture device 241, allowing the application launcher 246 to monitor the image capture device 241 and automatically process any graphical representations of objects 106 generated or recorded by the image capture device 241. However, in some embodiments, the application launcher 246 may process on the client device 100 the graphical representation 103 of the object 106 to generate a plurality of feature points representing the object 106. In these embodiments, the application launcher 246 may send the plurality of feature points to the object recognition application 209 instead of the graphical representation 103 itself.

Next the object recognition application 209 processes the graphical representation 103 of the object 106 using various computer vision and object recognition techniques. Combinations or techniques may also be used in order to identify an object 106 specifically versus an object 106 generally. For example, computer vision techniques may be used to determine that an object 106 in a photograph is a beverage can (e.g., soda, beer, etc.). An example computer vision technique is generating a plurality of feature points from the graphical representation 103, assuming that the application launcher 243 has not already provided a plurality of feature points. Other techniques, such as optical character recognition (OCR), may be used to read the label of the beverage can to determine the type of beverage can in the photograph (e.g., Coca-Cola®, Pepsi®, Budweiser®, etc.).

Once the object 106 is identified, the application management service 213 is provided with the object identifier 239 of the object 106. In some embodiments of the present disclosure, the object recognition application 209 provides the object identifier 239 to the application management service 213 in response to identifying the object 106. In other embodiments, the object recognition application 209 provides the object identifier 239 to the application launcher 246, which in turn provides the object identifier 239 to the application management service 213.

Once the application management service 213 receives the object identifier 239, it searches for client applications 109 associated with the object identifier 239 (and therefore associated with the object 106 corresponding to the object identifier 239). First, the application management service 213 can search the application data 223 for each client application 109 to see if the object identifier 239 of the identified object 106 is included in the application data 223. In addition, the application management service 213 can search the user data 219 of the user to search for a local object identifier 236 that the user has associated with the application identifier 233 of a client application 109.

The application management service 213 then generates a list of application identifiers 233 to return to the application launcher 246. The list of application identifiers 233 includes each application identifier 233 with an associated object identifier 239 included in its application data 223 of the client application 109. The list of application identifiers 233 can also include the application identifier 233 of each client application 109 for which the user has associated a local object identifier 236 that matches the object identifier 239 of the object 106. In instances where the local object identifier 2236 is used as a mask, the list of application identifiers 233 can omit those client applications 109 where the application data 233 includes an object identifier 239 that matches the object 106, but the local object identifier 236 associated with the application identifier 233 of the client application 109 indicates that the application identifier 233 is to be omitted from the list of application identifiers 233.

The application launcher 246 then receives the list of application identifiers 233 associated with the object identifier 239 of the object 106. For each client application 109 installed on the client device 100 with an application identifier 233 included in the list of application identifiers 233, the application launcher 246 will cause the user interface 249 to present an option for the user to launch or otherwise initiate execution of the installed client application 109. In some embodiments, the application launcher 246 will similarly cause the user interface 249 to present an option to the user to install a client application 109 with an application identifier 233 included in the list of application identifiers 233 if the client application 109 is not currently installed on the client device 100. For example, the application launcher 246 may present a link to the application management service 213 that allows for the user to purchase, download, and/or install the client application 109 from the application management service 213.

In the event that the user chooses to launch a client application 109 through the option in the user interface 249 presented by the application launcher 246, the client application 109 will begin execution. As part of the execution, the client application 109 may retrieve the appropriate authentication credentials 259 stored in the client data store 253 in order to allow the user to access the full functionality of the client application 109. Authentication may be performed using various techniques or protocols, such as the OAuth protocol.

Figure 3:
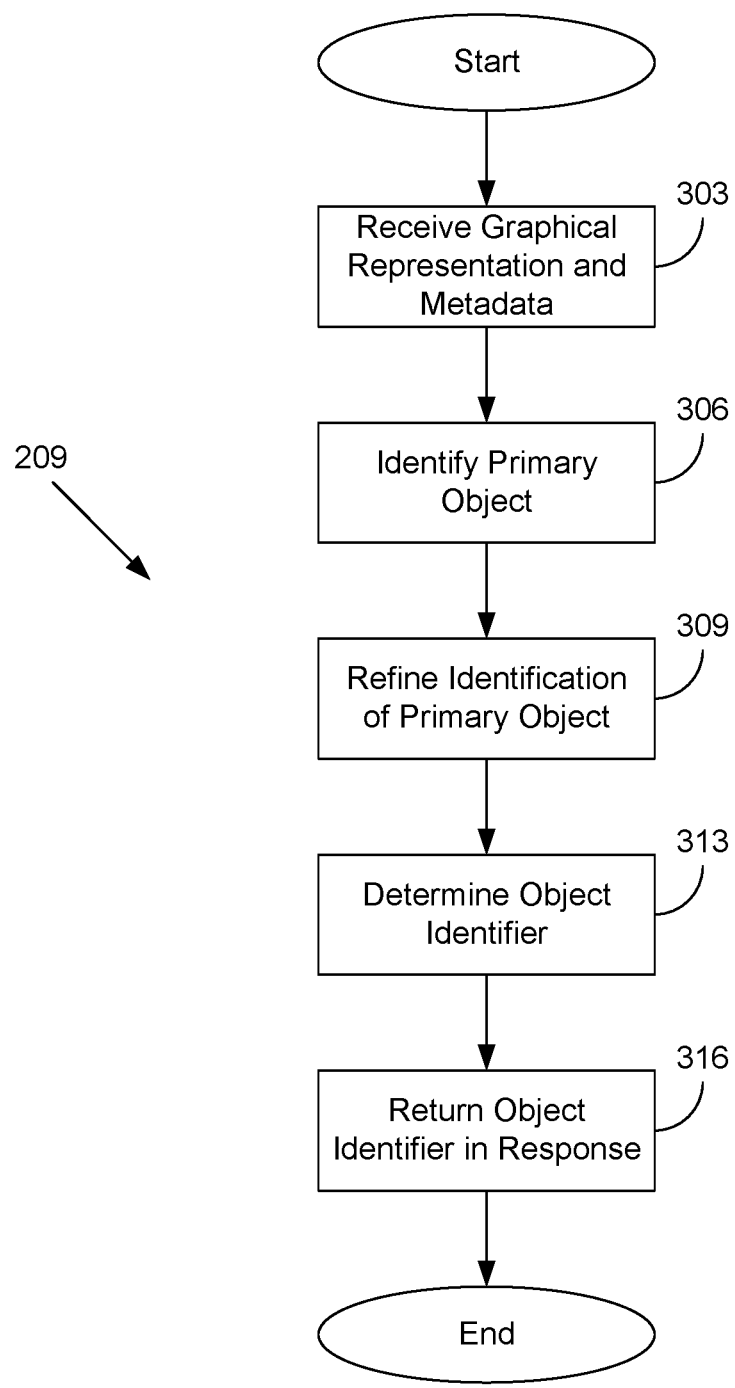
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the object recognition application 209 according to various embodiments. It is understood that the flowchart of FIG. 3 provides merely an example of the many different types of functional arrangements that may be employed to implement the operation of the portion of the object recognition application 209 as described herein. As an alternative, the flowchart of FIG. 3 may be viewed as depicting an example of elements of a method implemented in the computing environment 203 (FIG. 2) according to one or more embodiments.

Beginning with box 303, the object recognition application 209 receives a graphical representation 103 of an object 106 (FIG. 1) and metadata about either the object 106 itself or the graphical representation 103 of the object 106. For example, the object recognition application 209 may receive a photograph, video, or stereoscopic image containing the object 106, such as beverage can on a table or counter, building on a street, etc. The metadata can include the time and location at which the graphical representation 103 of the object 106 was generated, the client identifier 229 (FIG. 2) of the client device 100 that generated or captured the graphical representation 103 of the object 106, and potentially other data.

Proceeding to box 306, the object recognition application 209 identifies the primary object 106 in the graphical representation. For example, the object recognition application 209 may select the largest object 106 in the graphical representation, the most centrally located object 106 in the graphical representation, or select an object 106 using other factors or a combination of factors. The object recognition application 209 can then use various computer vision and object recognition techniques to identify the primary object 106. As in illustrative example, if an image contains a beverage can on a table as well as salt and pepper shakers in the background behind the beverage can, the object recognition application 209 may pick the beverage can as the primary object due to its larger perceived size as a result of its placement in the foreground. If the beverage can were centrally located in the image, this could indicate that the beverage can was the focus of the image and therefore the primary object 106 in the image. The object recognition application 209 could then analyze the image using various computer vision and object recognition techniques to determine that the primary object 106 was a beverage can, such as by generating a plurality of feature points for the beverage can and comparing the plurality of feature points to a known set of feature points that defines a beverage can.

In some embodiments, the object recognition application 209 may identify several objects 106 as potentially being the primary object 106. In these embodiments, the object recognition application 209 may send a request to the client device 100 (FIG. 2) for one of the identified objects 106 to be selected, confirmed, or otherwise indicated as the primary object 106. For example, if a number of objects 106 were clustered together on a table, the object recognition application 209 might determine that any of the objects 106 could potentially be the primary object 106, in which case clarification would be requested. However, in some embodiments, each of the objects 106 might be considered a primary object 106 and identified accordingly.

Moving on to box 309, the object recognition application 209 can refine its identification of the primary object 106 using additional image processing techniques as well as the metadata received at box 303. This allows the object recognition application 209 to identify a specific object 106 (e.g., a Coca-Cola can in John Doe's house) versus an object 106 generally (e.g., a beverage can). For example, the object recognition application 209 may use optical character recognition techniques (OCR) to read any text on the object 106 to further refine the identification. The object recognition application 209 may also determine the color(s) of the object 106 to determine its specific identity. The object recognition application 209 may also use metadata, such as the time and location that the graphical representation 103 was generated, to determine the specific identity of the object 106. For example, an image of an object 106 may be determined at box 306 to be an image of a pick-up truck. At box 309, OCR may be used to determine that word "FORD" is written on the tailgate of the pickup truck, that the color of the pick-up truck is red, and that it was taken at coordinates matching the address 123 MAIN ST., SOMETOWN, SOME STATE. Assuming that object data 226 existed for a red, FORD® pickup truck parked at 123 MAIN ST., SOMETOWN, SOME STATE, the object recognition application 209 can then identify the specific pick-up truck in the image versus identifying the image as including a generic pickup truck. For example, if a user created object data 226 record (FIG. 2) for his or her own red FORD pick-up truck at his or her place of employment at 123 MAIN ST., this would allow for the object recognition application 209 to identify the user's pick-up truck specifically rather than a pick-up truck generally. Other metadata may be provided with or inferred from the image in some embodiments to allow further refinements of the identification of the primary object 106 in the image.

Referring next to box 313, the object recognition application 209 determines the object identifier 239 (FIG. 2) of the identified object 106. The object recognition application 209 searches the object data 226 records in the data store 216 (FIG. 2) to find the object data 226 record that most closely matches the identified object 106. For example, the object recognition application 209 may determine that the primary object 106 in an image is red, FORD pick-up truck located at 123 MAIN ST., SOMETOWN, SOME STATE. If an object data 226 record exists for a red, FORD pick-up truck located at 123 MAIN ST., SOMETOWN, SOME STATE, then the object identifier 239 of that object data 226 record will be selected as the appropriate object identifier 239. However, if the closest matching object data 226 record is for a red pick-up truck, or even more generally just a pick-up truck, then the object identifier 239 of the object data 226 record for the red pick-up truck, or possibly more generally a pick-up truck, will be selected.

Proceeding to box 316, the object recognition application 209 sends a response to the requesting application or device. The response can include the object identifier 239 selected at box 313, and potentially other data. Alternatively, in some embodiments, the object recognition application 209 may instead forward, provide, send, or otherwise transmit the object identifier to an application, service, or device separate from the application or device that provided the graphical representation 103 of the object 106 at box 303.

Figure 4:
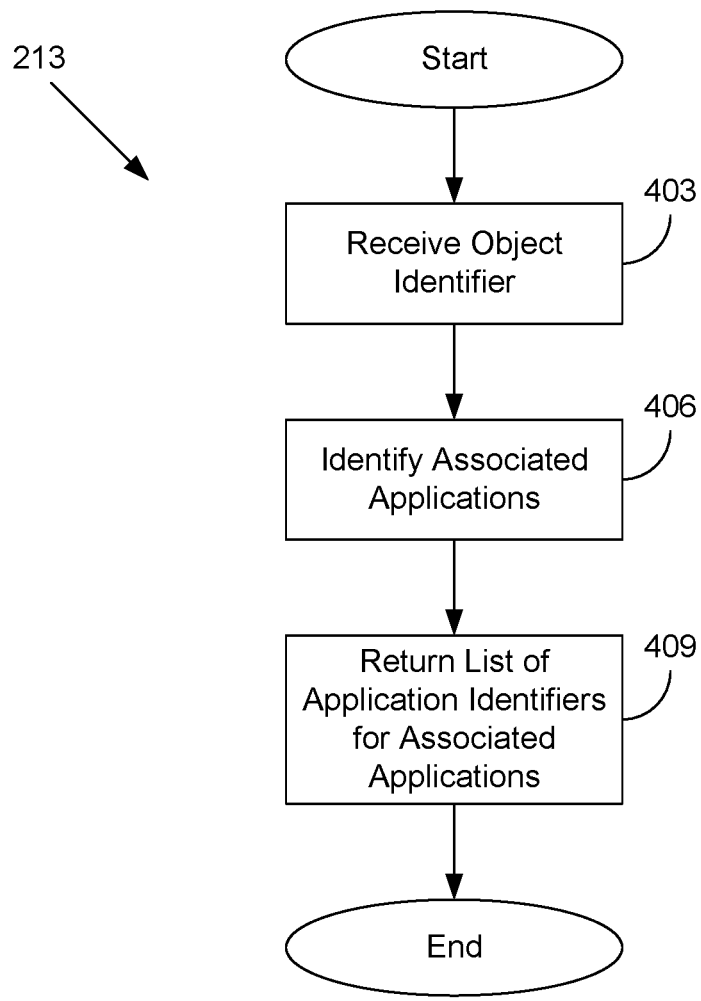
FIG. 4 is a flowchart illustrating one example of functionality implemented as portions of an application executed in a computing environment in the networked environment of FIG. 2 according to various embodiments of the present disclosure

Referring next to FIG. 4, shown is a flowchart that provides one example of the operation of a portion of the application management service 213 according to various embodiments. It is understood that the flowchart of FIG. 4 provides merely an example of the many different types of functional arrangements that may be employed to implement the operation of the portion of the application management service 213 as described herein. As an alternative, the flowchart of FIG. 4 may be viewed as depicting an example of elements of a method implemented in the computing environment 203 (FIG. 2) according to one or more embodiments.

Beginning with box 403, the application management service 213 receives an object identifier 239 (FIG. 2) and potentially a client identifier 229 (FIG. 2) identifying the client device 100. In some embodiments, the object identifier 239 and client identifier 229 may be provided by the object recognition application 209 (FIG. 2). In other embodiments, the object identifier 239 and the client identifier 229 may be provided by the application launcher 246 (FIG. 2) or other application executing on the client device 100.

Proceeding to box 406, the application management service 213 identifies one or more client applications 109 (FIG. 1) associated with provided object identifier 239. Generally, the application management service 213 first identifies each application data 223 record (FIG. 2) that includes the provided object identifier 239. The application identifiers 233 (FIG. 2) included in these matching application data 223 records are added to a list of matching application identifiers 233. The application management service 213 can then search the list of application identifiers 233 associated with the provided client identifier 229 to determine whether a local object identifier 236 (FIG. 2) matching the provided object identifier 239 exists. Generally, each application identifier 233 with a matching local object identifier 236 will also be added to the list of matching application identifiers 233. However, in those instances where the local object identifier 236 is used as a mask of filter, then each application identifier 233 with a local object identifier 236 that matches the provided object identifier 239 will be removed from the list of application identifiers 233.

Moving on to box 409, the application management service 213 returns the list of application identifiers 233 to the requesting service, application or device. For example, if the object recognition application 209 or the application launcher 246 had sent the object identifier 239 and client identifier 229 at box 403, then the list of application identifiers 233 would be returned to the requesting object recognition application 209 or application launcher 246. However, in some embodiments, the application management service 213 can be configured to forward the list of application identifiers 233 to another application, service or device. For instance, in some embodiments, the object recognition service 209 may provide the object identifier 239 and client identifier 229 at box 403, but the application management service 213 may be configured to send the list of application identifiers 233 to the application launcher 246 executing on the client device 100 corresponding to the client identifier 229.

Figure 5:
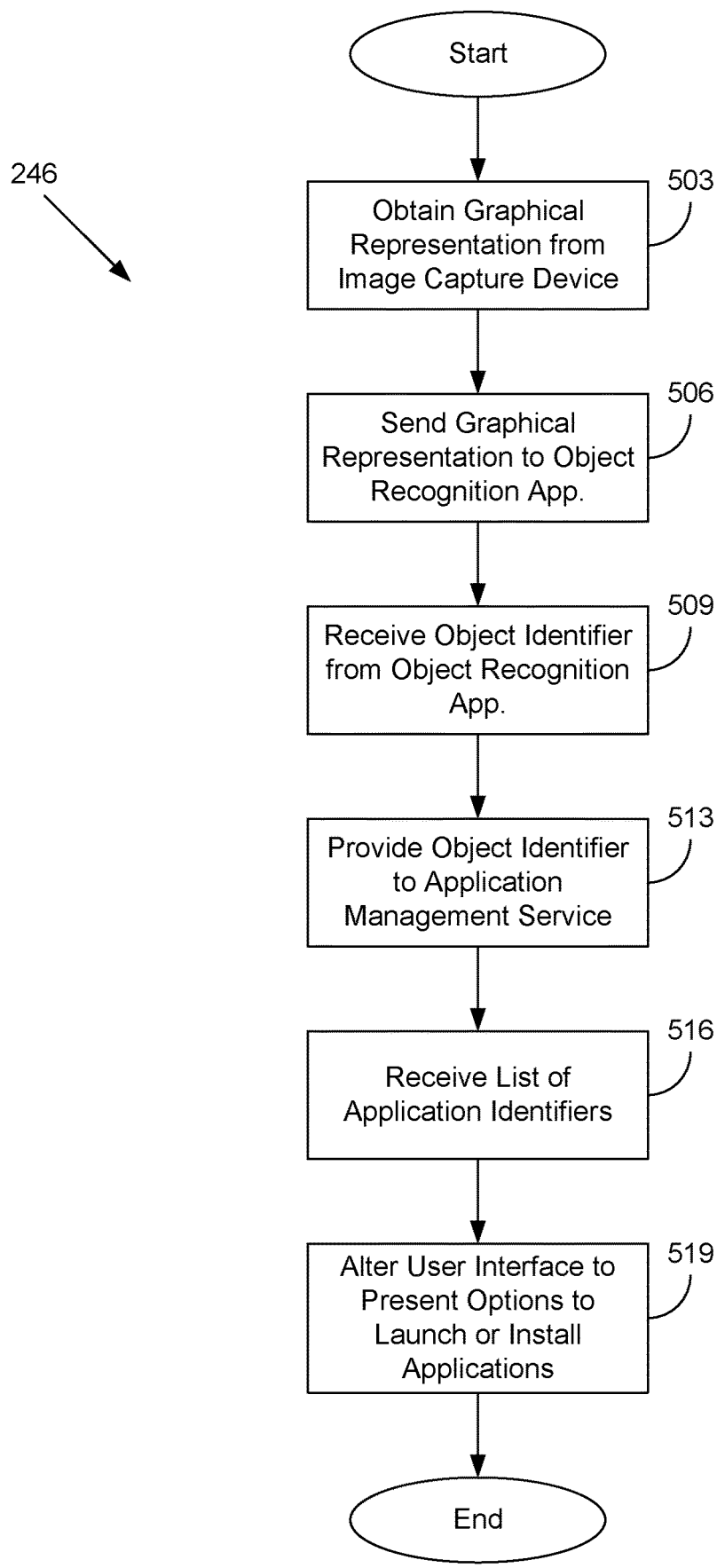
FIG. 5 is a flowchart illustrating one example of functionality implemented as portions of an application executed in a computing environment in the networked environment of FIG. 2 according to various embodiments of the present disclosure

Referring next to FIG. 5, shown is a flowchart that provides one example of the operation of a portion of the application launcher 246 according to various embodiments. It is understood that the flowchart of FIG. 5 provides merely an example of the many different types of functional arrangements that may be employed to implement the operation of the portion of the application launcher 246 as described herein. As an alternative, the flowchart of FIG. 5 may be viewed as depicting an example of elements of a method implemented in the client device 100 (FIGS. 1 and 2) according to various embodiments of the present disclosure.

Beginning with box 503, the application launcher 246 obtains a graphical representation 103 of an object 106 (FIG. 1) from an image capture device 241 of the client device 100 (FIG. 2). This can be accomplished in a number of ways. For example, the application launcher 246 may access one or more graphical representations (e.g., photographs, videos, stereoscopic images, etc.) stored on the client device 100 that were generated by the image capture device 241. As another example, the application launcher 246 may have the appropriate permissions to control the image capture device 241 and allow the user to manually generate the graphical representation 103 of the object 106 using the image capture device 241 (e.g., take a photograph, record a video, etc.). In some instances, another client application 109 that has access to the image capture device 241 (e.g., a camera application on a mobile device) may provide the graphical representation 103 of the object to the application launcher 246 automatically (e.g., whenever a photograph is taken or a video is recorded). In similar instances, the other client application 109 that has access to the image capture device 241 (e.g., the camera application) may provide an option on the user interface 249 (FIG. 2) to allow a user to send the graphical representation 103 of the object 106 (e.g., a picture, video, or stereoscopic image) to the application launcher 246.

In some embodiments, the application launcher 246 may optionally process the graphical representation 103 of the object 106 to generate a secondary representation of the object 106. For example, the application launcher 246 may generate a plurality of feature points corresponding to the object 106 in the graphical representation 103.

Proceeding to box 506, the application launcher 246 sends the graphical representation 103 of the object 106 or the secondary representation of the object 106 (e.g., a plurality of feature points representing the object 106) to the object recognition application 209 (FIG. 2). For example, the application launcher 246 may invoke a function call provided by an application programming interface (API) of the object recognition application 209 to send the graphical representation 103 of the object 106 across the network 206 (FIG. 2) to the object recognition application 209. However, other approaches may also be used.

Moving on to box 509, the application launcher 246 can, in some embodiments, receive the object identifier 239 (FIG. 2) from the object recognition application 209. For example, the API call invoked previously at box 506 may provide a response or return message that includes the object identifier 239. However, in those alternative embodiments previously discussed where the object recognition application 209 provides the object identifier 239 directly to the application management service 213, this step may be omitted.

Referring next to box 513, the application launcher 246 then provides the object identifier 239 received from the object recognition application 209 to the application management service 213 (FIG. 2). For example, the application launcher 246 may invoke a function call provided by an application programming interface (API) of the application management service 213 to send the object identifier to the application management service 213. However, other approaches may also be used. In those alternative embodiments previously discussed where the object recognition application 209 provides the object identifier 239 directly to the application management service 213, this step may be omitted.

Proceeding to box 516, the application launcher 246 receives a list of application identifiers 233 from the application management service 213. The list of application identifiers 233 can include an application identifier 233 for each client application 109 associated with an object identifier 239 for an object 106.

Moving on to box 519, the application launcher 246 then causes a user interface 249 to be rendered, or alters a currently rendered user interface 249, that allows the user to initiate execution of a client application 109 with an application identifier 233 included in the list of application identifiers 233 or install a client application 109 with an application identifier 233 included in the list of application identifiers 233. For example, the list of application identifiers 233 may include three application identifiers 233. Two of the application identifiers 233 may identify respective client applications 109 installed on the client device 100. However, the third application identifier 233 may identify a third client application 109 that is not currently installed on the client device 100. In such a situation, the application launcher 246 could present a user interface 249 that allows the user to launch either of the installed client applications 109 or to download and install the third client application 109 from the application management service 213.

Figure 6:
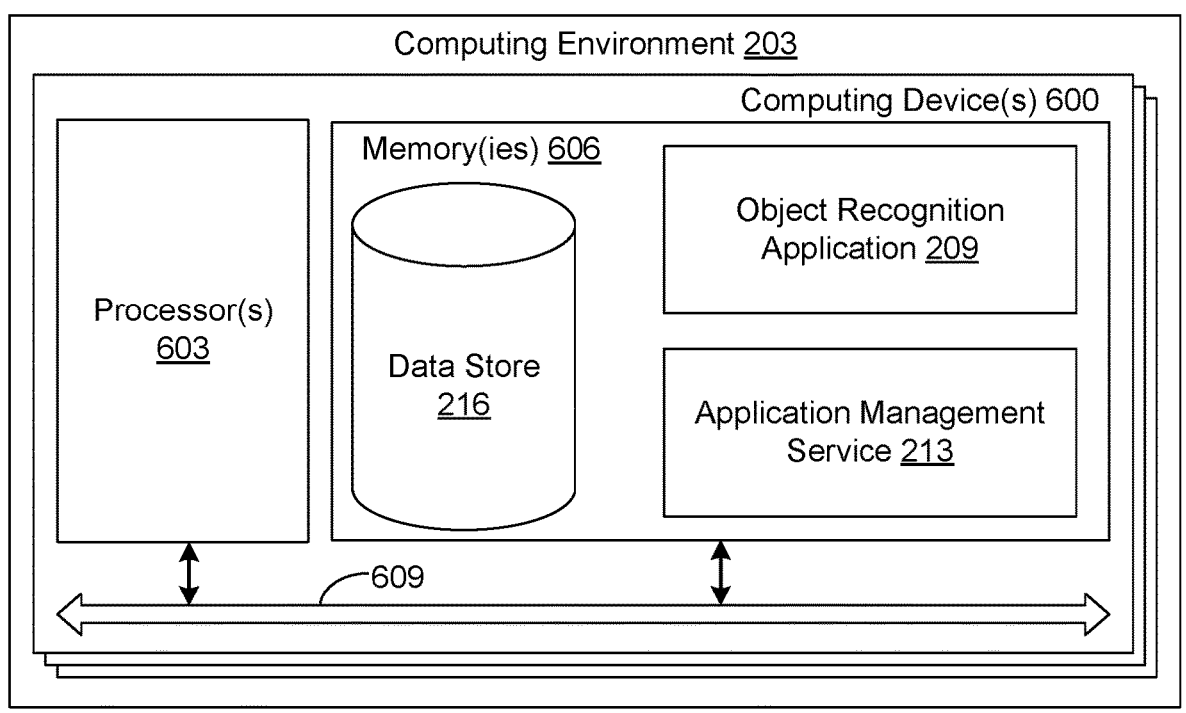
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may include, for example, at least one server computer or like device. The local interface 609 may include, for example, a data bus with an accompanying address/control bus or other bus structure as can be appreciated.

Stored in the memory 606 are both data and several components that are executable by the processor 603. In particular, stored in the memory 606 and executable by the processor 603 are the object recognition application 209, the application management service 213, and potentially other applications. Also stored in the memory 606 may be a data store 216 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 603 may represent multiple processors 603 or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606. The local interface 609 may include additional systems designed to coordinate this communication, including, for example, performing load balancing. The processor 603 may be of electrical or of some other available construction.

Although the object recognition application 209, the application management service 213, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality, operation, and interaction of portions of the object recognition application 209, the application management service 213, and the application launcher 246. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 603 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowcharts of FIGS. 3-5a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the object recognition application 209, the application management service 213, and the application launcher 246, that includes software or code can be embodied in any non-transitory computer-readable medium for use by or in connection with an instruction execution system such as, for example, a processor 603 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the object recognition application 209, the application management service 213, and the application launcher 246, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600 or client device 100, or in multiple computing devices 600 or client devices 100 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory;
machine readable instructions stored in the memory that, when executed by the processor, cause the computing device to at least:
receive a graphical representation of an object from a client device;
identify the object in the graphical representation;
determine an object identifier for the object, the object identifier representing an association between an application and the object that is publicly visible;
identify a plurality of application data records that comprise the object identifier;
generate a list of application identifiers comprising respective application identifiers of a plurality of application identifiers that correspond to individual application data records of the plurality of application data records;
identify, from user data associated with a user, a first local object identifier that matches the object identifier, the first local object identifier representing a user-defined association between a first application and the object that is personal to the user;
add, to the list of application identifiers, a first application identifier associated with the first local object identifier;
identify, from the user data associated with the user, a second local object identifier that matches the object identifier, the second local object identifier representing a user-defined disassociation between a second application and the object that is personal to the user;
remove, from the list of application identifiers, a second application identifier associated with the second local object identifier; and
provide the list of application identifiers associated with the object to the client device, the list of application identifiers associated with the object including the first application identifier and excluding the second application identifier.

2. The system of claim 1, wherein the machine readable instructions, when executed by the processor, further cause the computing device to at least:
receive the first application identifier.

3. The system of claim 1, wherein the first application identifier is uniquely associated with the object with respect to the client device.

4. The system of claim 1, wherein the list of application identifiers associated with the object is unique to the client device.

5. The system of claim 1, wherein the graphical representation is a stereoscopic image of the object.

6. The system of claim 1, wherein the graphical representation of the object is a video of the object.

7. The system of claim 1, wherein the graphical representation of the object is two-dimensional image of the object.

8. The system of claim 1, wherein the machine readable instructions, when executed by the processor, further cause the computing device to at least:
receive metadata corresponding to the object to from the client device, the metadata comprising a time and location at which the graphical representation was generated and an identifier corresponding to the client device.

9. A non-transitory computer-readable medium storing machine-readable instructions that, when executed by a processor of a computing device, cause the computing device to at least:
receive a graphical representation of an object from a client device;
identify the object in the graphical representation;
determine an object identifier for the object, the object identifier representing an association between an application and the object that is publicly visible;
identify a plurality of application data records that comprise the object identifier;
generate a list of application identifiers comprising respective application identifiers of a plurality of application identifiers that correspond to individual application data records of the plurality of application data records;
identify, from user data associated with a user, a first local object identifier that matches the object identifier, the first local object identifier representing a user-defined association between a first application and the object that is personal to the user;
add, to the list of application identifiers, a first application identifier associated with the first local object identifier;
identify, from the user data associated with the user, a second local object identifier that matches the object identifier, the second local object identifier representing a user-defined disassociation between a second application and the object that is personal to the user;
remove, from the list of application identifiers, a second application identifier associated with the second local object identifier; and
provide the list of application identifiers associated with the object to the client device, the list of application identifiers associated with the object including the first application identifier and excluding the second application identifier.

10. The non-transitory computer-readable medium of claim 9, wherein the machine-readable instructions, when executed by the processor, further cause the computing device to at least:
receive the first application identifier.

11. The non-transitory computer-readable medium of claim 9, wherein the first application identifier is uniquely associated with the object with respect to the client device, and the list of application identifiers associated with the object is unique to the client device.

12. The non-transitory computer-readable medium of claim 9, wherein the graphical representation is a stereoscopic image of the object.

13. The non-transitory computer-readable medium of claim 9, wherein the graphical representation of the object is a video of the object.

14. The non-transitory computer-readable medium of claim 9, wherein the graphical representation of the object is two-dimensional image of the object.

15. The non-transitory computer-readable medium of claim 9, wherein the machine-readable instructions, when executed by the processor, further cause the computing device to at least:
receive metadata corresponding to the object to from the client device, the metadata comprising a time and location at which the graphical representation was generated and an identifier corresponding to the client device.

16. A method, comprising:
receiving a graphical representation of an object from a client device;
identifying the object in the graphical representation;
determining an object identifier for the object, the object identifier representing an association between an application and the object that is publicly visible;
identifying a plurality of application data records that comprise the object identifier;
generating a list of application identifiers comprising respective application identifiers of a plurality of application identifiers that correspond to individual application data records of the plurality of application data records;
identifying, from user data associated with a user, a first local object identifier that matches the object identifier, the first local object identifier representing a user-defined association between a first application and the object that is personal to the user;
adding, to the list of application identifiers, a first application identifier associated with the first local object identifier;
identifying, from the user data associated with the user, a second local object identifier that matches the object identifier, the second local object identifier representing a user-defined disassociation between a second application and the object that is personal to the user;

removing, from the list of application identifiers, a second application identifier associated with the second local object identifier; and providing the list of application identifiers associated with the object to the client device, the list of application identifiers associated with the object including the first application identifier and excluding the second application identifier.

17. The method of claim 16, further comprising receiving the first application identifier.

18. The method of claim 16, wherein the first application identifier is uniquely associated with the object with respect to the client device, and the list of application identifiers associated with the object is unique to the client device.

19. The method of claim 16, wherein the graphical representation is a stereoscopic image of the object, a video of the object, or a two-dimensional image of the object.

20. The method of claim 16, receiving metadata corresponding to the object to from the client device, the metadata comprising a time and location at which the graphical representation was generated and an identifier corresponding to the client device.

* * * * *